(12) United States Patent
Dynys et al.

(10) Patent No.: US 6,592,808 B1
(45) Date of Patent: Jul. 15, 2003

(54) CERMET SINTERING OF CERAMIC DISCHARGE CHAMBERS

(75) Inventors: Frederick W. Dynys, Chagrin Falls, OH (US); Curtis Edward Scott, Mentor, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/475,433

(22) Filed: Dec. 30, 1999

(51) Int. Cl.⁷ .................. C22C 32/00; B22F 1/02; B28B 1/00; C04B 33/32; C04B 35/64
(52) U.S. Cl. .................. 419/19; 419/41; 264/632; 264/634; 428/36.9; 428/36.92
(58) Field of Search .................. 75/232, 235, 234, 75/228; 419/5, 10, 19, 20, 38, 41; 252/518.1, 520.5; 313/221–2.1, 589, 231.7, 231.6; 315/84.61; 264/614, 632, 642, 681, 634; 428/34.4, 34.5, 36.9, 36.92

(56) References Cited

U.S. PATENT DOCUMENTS

| | | | | |
|---|---|---|---|---|
| 4,155,758 A | * | 5/1979 | Evans et al. | 75/232 |
| 4,285,732 A | * | 8/1981 | Charles et al. | 106/57 |
| 4,602,956 A | * | 7/1986 | Partlow et al. | 75/235 |
| 5,408,157 A | * | 4/1995 | Alderman et al. | 313/25 |
| 5,487,353 A | | 1/1996 | Scott et al. | 117/4 |
| 5,725,827 A | * | 3/1998 | Rhodes et al. | 264/614 |
| 5,742,124 A | | 4/1998 | Kees et al. | 313/625 |

FOREIGN PATENT DOCUMENTS

| | | | | |
|---|---|---|---|---|
| EP | 0 587 238 A1 | | 9/1993 | |
| JP | 54-132374 A | * | 10/1979 | H01J/61/92 |

\* cited by examiner

*Primary Examiner*—Harold Pyon
*Assistant Examiner*—Michael C. Miggins
(74) *Attorney, Agent, or Firm*—Fay, Sharpe, Fagan, Minnich & McKee, LLP

(57) ABSTRACT

A method of making a ceramic discharge chamber comprising forming a plurality of preform chambers by assembling at least two ceramic components. The preform chambers are axially aligned within a tube, comprised of an alumina cermet. The tube containing the preform chambers is then fired at a temperature of at least 900° C.

11 Claims, 2 Drawing Sheets

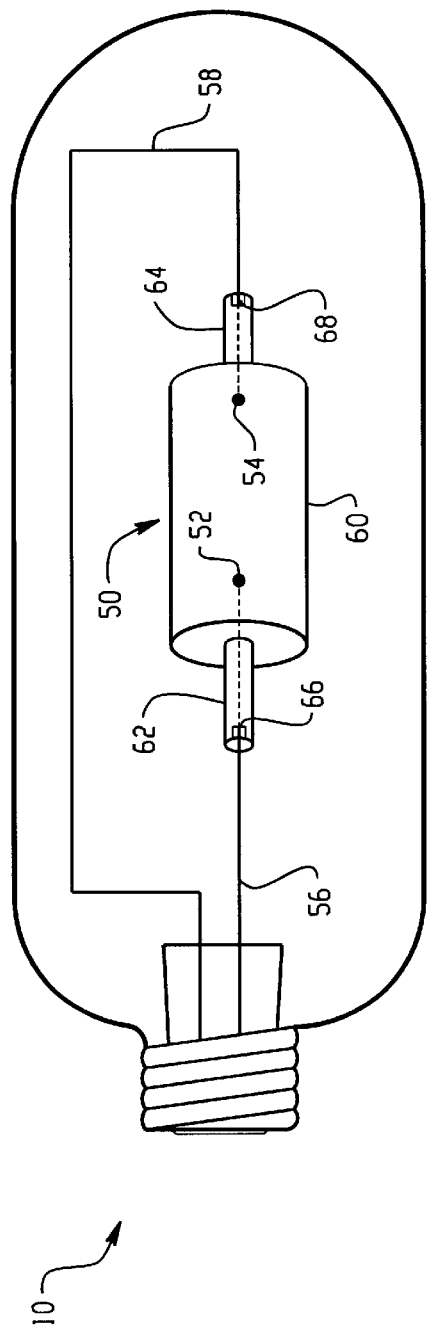
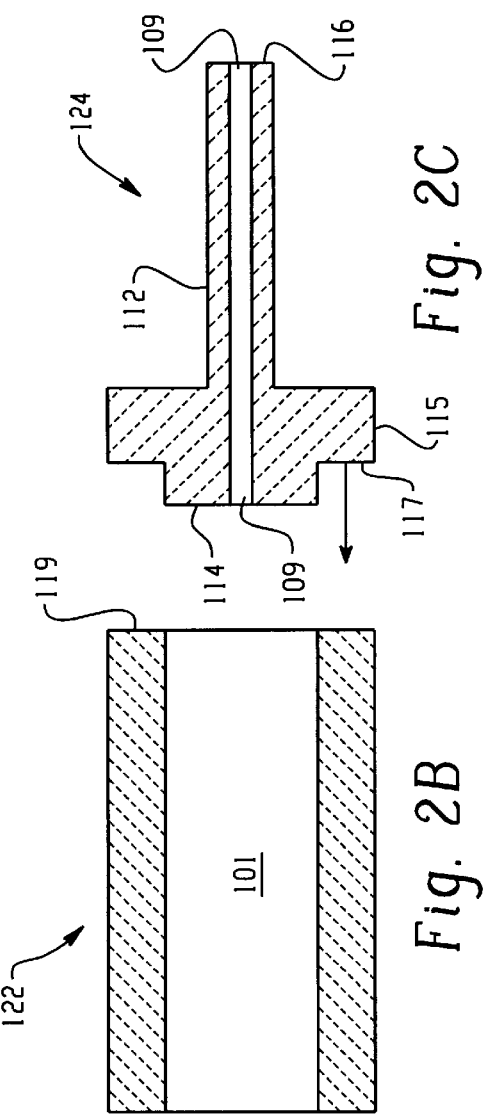
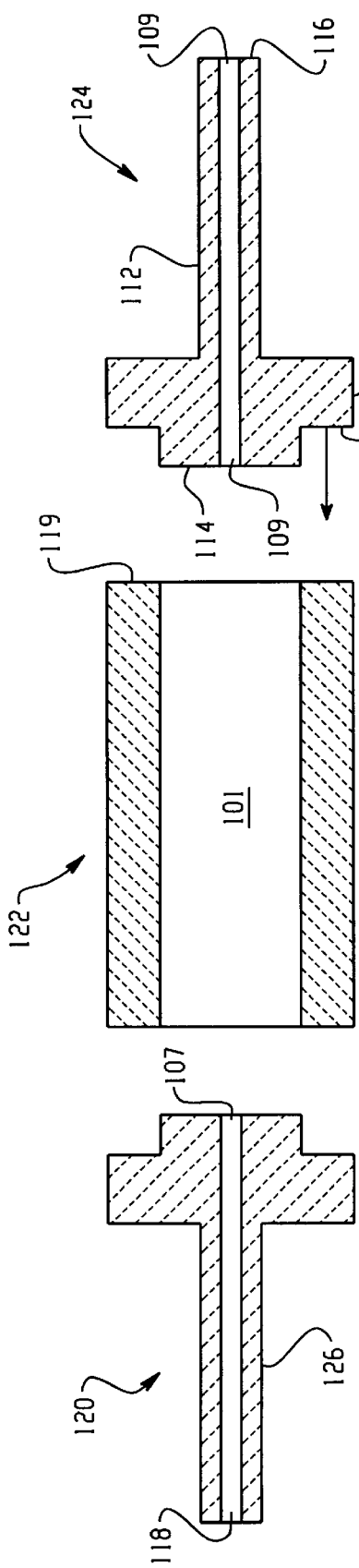

CERMET SINTERING OF CERAMIC DISCHARGE CHAMBERS

BACKGROUND OF THE INVENTION

This invention relates to generally lighting, and more particularly, to ceramic discharge chambers for a lamp, such as a ceramic metal halide lamp or a high pressure sodium discharge lamp.

The present invention relates generally to lighting, and more specifically, to a ceramic arc chamber for a discharge lamp, such as a ceramic metal halide lamp. This invention relates particularly to a method of manufacturing ceramic arc chambers, and more particularly, to a method for sintering ceramic arc chambers.

Discharge lamps produce light by ionizing a fill such as a mixture of metal halides and mercury with an electric arc passing between two electrodes. The electrodes and the fill are sealed within a translucent or transparent discharge chamber which maintains the pressure of the energized fill material and allows the emitted light to pass through it. The fill, also known as a "dose", emits a desired spectral energy distribution in response to being excited by the electric arc.

Initially, the discharge chamber in a discharge lamp was formed from a vitreous material such as fused quartz, which was shaped into a desired chamber geometry after being heated to a softened state. Fused quartz, however, has certain disadvantages which arise from its reactive properties at high operating temperatures. For example, at temperatures greater than about 950 to 1,000° C., the halide fill reacts with the glass to produce silicates and silicon halide, reducing the fill constituents. Elevated temperatures also cause sodium to permeate through the quartz wall. These fill depletions cause color shift over time, which reduces the useful life of the lamp.

Ceramic discharge chambers were developed to operate at high temperatures for improved color temperatures, color renderings, luminous efficacies, while significantly reducing reactions with the fill material. U.S. Pat. Nos. 4,285,732 and 5,725,827, for example, disclose translucent polycrystalline sintered bodies where visible wavelength radiation is sufficiently able to pass through to make the body useful for use as an arc tube.

Typically, ceramic discharge chambers are constructed from a number of parts extruded or die pressed from a ceramic powder and then sintered together. For example, referring now to European Patent Application No. 0587238, five ceramic parts are used to construct the discharge chamber of a metal halide lamp. Two end plugs with a central bore are fabricated by die pressing a mixture of a ceramic powder and inorganic binder. A central cylinder and the two legs are produced by extruding a ceramic powder/binder mixture through a die. After forming the part, it is typically air sintered between 900–1400° C. to remove organic processing aids. Assembly of the discharge chamber requires tacking of the legs to the cylinder plugs, and the end plugs into the end of the central cylinder. This assembly is then sintered to form joins which are bonded by controlled shrinkage of the individual parts.

In alternative structures, two and three component lamps have been developed and include end pieces of tubes/end caps and a central body. Typically, to facilitate the appropriate binding and mating of these components, the components are horizontally aligned within a molybdenum sintering tube. The sintering process performed in molybdenum tubes is a relatively expensive operation. More particularly, a 3' molybdenum tube costs several hundred dollars per piece. Accordingly, it would be desirable to provide an alternative housing within which a ceramic discharge chamber can be sintered.

BRIEF SUMMARY OF THE INVENTION

According to an exemplary embodiment of this invention, a method is provided for making a ceramic discharge chamber by forming a plurality of chamber components and assembling the chamber components into a chamber preform. The chamber preform is then positioned within a tube, the tube being comprised of an alumina cermet. The tube containing the chamber preform is then sintered.

This exemplary embodiment of the invention advantageously reduces the unit cost of manufacture of the ceramic discharge chambers. More particularly, the alumina cermet tubes of the present invention are relatively inexpensive yet exhibit long operational life. Furthermore, the alumina cermet tubes reduce the formation of blemishes in the arc discharge chambers which may occur as a result of a seam which is present in a traditional molybdenum tube.

BRIEF DESCRIPTION OF THE DRAWINGS

Other features and advantages of the invention will be more readily understood upon reading the following detailed description in conjunction with the drawings in which:

FIG. 1 illustrates a light source which includes a ceramic discharge chamber according to an exemplary embodiment of the invention;

FIGS. 2A–2C illustrate components of a discharge chamber for a metal halide lamp.

DETAILED DESCRIPTION OF THE INVENTION

Figure 3:
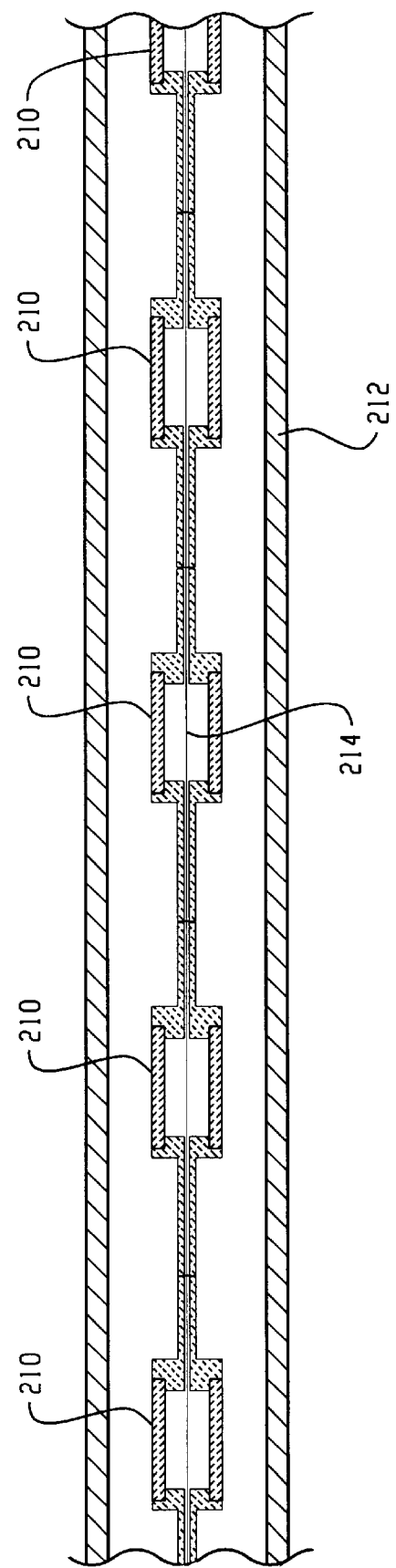
FIG. 3 illustrates a partial view in cross section of a alumina cermet tube in a loaded condition in accord with the present invention.

FIG. 1 illustrates a discharge lamp 10 according to an exemplary embodiment of the invention. Discharge lamp 10 includes a discharge chamber 50 which contains two electrodes 52, 54 and fill material. Electrodes 52, 54 are connected to conductors 56, 58, which apply a potential difference across the electrodes. In operation, the electrodes 52, 54 produce an arc which ionizes a fill material to produce a plasma in the discharge chamber 50. The emission characteristics of the light produced by the plasma depend primarily on the constituents of the fill material, the voltage across the electrodes, the temperature distribution of the chamber, the pressure in the chamber, and the geometry of the chamber. For a ceramic metal halide lamp, the fill may typically comprise a mixture of Hg, a rare gas such as Ar or Xe and a metal halide such as NaI, TlI, $DyI_3$. For high pressure sodium lamp, the fill material typically comprises sodium, a rare gas, and Hg. Other fill materials are also well known in the art, and the present invention is believed to be suitable for operation with any of those recognized ionizable materials.

As shown in FIG. 1, the discharge chamber 50 comprises a central body portion 60 and two leg portions 62, 64. The ends of the electrodes 52, 54 are typically located near the opposite ends of the body portion 60. The electrodes are connected to a power supply by the conductors 56, 58 which are disposed within a central bore of each leg portion 62, 64. The electrodes are typically comprised of tungsten. The conductors typically comprise niobium and molybdenum which have thermal expansion coefficients close to that of alumina to reduce thermally induced stresses on the alumina leg portion 62, 64.

The discharge chamber 50 is sealed at the ends of the leg portions 62, 64 with seals 66, 68. The seal 66, 68 typically comprise a disprosia-alumina-silica glass that can be formed by placing a glass frit in the shape of a ring around one of the conductors, eg. 56, aligning the discharge chamber 50 vertically and melting the frit. The melted glass then flows down into the leg 62, forming a seal between the conductor 56 and the leg 62. The discharge chamber is then turned upside down to seal the other leg 64 after being filled with the fill material.

The leg portion 62, 64, extends axially away from the center of the discharge chamber 50. The dimensions of the leg portions 62, 64 are selected over the temperature of the seal 66, 68 by desired amount with respect to the center of the discharge chamber 50. For example, in a 70 watt lamp, the leg portion portions have a length of about 10–15 mm, an inner diameter of 0.8–1.0 mm and an outer diameter of about 2.5–3.0 mm to lower the temperature at the seal 66, 68 to about 600 to 7000° C., which is about 400° C. less than the temperature at the center of the discharge chamber. In a 35 watt lamp, the leg portions have a length of about 10–15 mm, an inner diameter of 0.7 to 0.8 mm and an outer diameter of about 2.0–2.5 mm. In a 150 watt lamp, the leg portions have a length of about 12–15 mm and an inner diameter of about 0.9–1.1 mm, and an outer diameter of about 2.5–3.0 mm. These dimensions, and others through the specification, are of course given as examples and are not intended to be limiting.

The body portion 60 of the discharge chamber is typically substantially cylindrical. For a 70 watt lamp, the body portion typically has an inner diameter of about 7 mm and outer diameter of about 8.5 mm. For a 35 watt lamp, the body portion typically has an inner diameter of about 5 mm and an outer diameter of about 6.5 mm. For a 150 watt lamp, the body portion typically has an inner diameter of about 9.5 mm and an outer diameter of 11.5 mm.

FIGS. 2A–2C illustrate components of a discharge chamber formed from three elements. In FIG. 2B, a body member 122 is shown which is substantially cylindrical. The body member 122 of FIG. 1B can be formed by injection molding, die pressing, or by any other technique known in the art. For example, the body member 122 can also be formed by extrusion.

The leg member 124 is depicted which includes a leg portion 112 and a transition portion 114. Both the leg portion 112 and the transition portion 114 include a central bore 109 which houses one of the two electrodes and the conductor. Transition portion 114 may be generally in the form of a plug which fits inside the end of the body member 122. Transition portion 114 typically has a circumference which is greater than the circumference of the leg portion 112. Transition portion 114 typically includes a radially directed flange 115 which projects radially outwardly from transition portion 114. The radially directed flange 115 provides a shoulder 117 which rests against the end 119 of the body member 122 during assembly and fixes the relative axial position of leg member 124 with respect to the body member 122. "Axial" refers to an axis through the central bores 107, 109 in leg portions 112, 126.

The radially directed flange 115 provides the advantage of the total length of the assembled discharge chamber, e.g. measured from the end 118 of leg member 120 to the opposite end 116 of leg member 124 can be maintained to within a tight dimensional tolerance. The total length of the discharge chamber typically effects the separation between the electrodes, since the electrodes are typically referenced to the ends 116, 118 of the leg portions, 120, 126 during assembly. For example, the conductor may be crimped at a fixed distance from the end of the electrode, which crimp rests against of the leg portion to fix the axial position of the electrode with respect to the leg portion. Because the axial position of the electrodes is fixed with respect to the leg portions, the separation of the electrodes is determined by the position of the leg member 124 with respect to the body member 122 which can be precisely controlled by the radially directed flange 115. The radially directed flange 115 thus allows the electrodes to be consistently positioned to have a precise separation distance, which provides consistency and quality of the light produced.

The body member 122 and the leg members 120, 124 can be constructed by die pressing a mixture of ceramic powder in a binder in to a solid cylinder. Alternatively, the mixture can be extruded or injection molded. As will be recognized by the skilled artisan, depending on which process of manufacture is used, the mixture comprises various amounts of ceramic powder and organic binder. Subsequent to formation, the binder is removed from the green part, typically by thermopyrollisis, to form a bisque-fired part. The machined parts are typically assembled prior to sintering to allow the sintering step to bond the parts together.

According to an exemplary method of bonding, the densities of the bisque-fired parts used to form the body member 122 and the leg members 120, 124 are selected to achieve different degrees of shrinkage during the sintering step. The different densities in the bisque-fired parts may achieved by using ceramic powders having different surface areas. For example, the surface area of the ceramic powder used to form body member 122 may be 6–10 meters squared per gram, while the surface area of the ceramic body used to form the leg members 120 and 124 may be 2–3 meters squared per gram. The finer powder in the body member 122 causes the bisque-fired body member 122 to have a lower density than the bisque-fired leg members 120 and 124 made from the coarser powder. Because the bisque-fired body member is less dense than the bisque-fired leg members, the body portion shrinks to a greater degree (eg 3–10%) during sintering than the transition portion 114 to form a seal along transition portion 114.

The sintering step may be carried out by heating the bisque-fired parts in hydrogen having a dew point of about 10–15°. Typically, the temperatures increase from room temperature to about 1300° C. over a two hour period. Next, the temperature is held to about 1300° C. for about 2 hours. Next, the temperature is increased by about 100° C. per hour up to a maximum temperature of about 1850–1880° C. Next, the temperature is held at 1850–1880° C. for about 3.5 hours. Finally, the temperature is decreased from room temperature for two hours. The resulting ceramic material comprises densely sintered polycrystalline aluminum.

Referring now to FIG. 3, the assembled arc discharge chambers 210 are axially aligned within alumina cermet tube 212. Preferably, a wire 214, preferably of tungsten or other suitable metal, is run axially through the aligned arc discharge chamber parts 210 to suspend the bodies within the tube environment. This process is beneficial from the perspective that the metal component of the cermet material, more fully described herinbelow, forms a dominant component of the atmosphere surrounding the arc discharge chambers during the sintering stage. This metallic component in the atmosphere forms a relatively large portion of the partial pressure thereof and is advantageous in controlling introduction of impurities and structuring grain growth during sintering of the components.

After loading of the alumina cermet tubes, a plurality of tubes may be loaded into a furnace and sintering may be carried out by heating the bisque-fired parts in hydrogen having a dew point of about 0–10° C. Typically, the temperature is increased from room temperature to about 1300° C. over a two hour period. Next, the temperature is held at about 1300° C. for about two hours. Next, the temperature is increased up to a maximum temperature of 1850–1880° C. and held at 1850–1880° C. for about 3–10 hours. Finally, the temperature is decreased to room temperature over about two hours. Of course, the arc discharge chamber components can be manufactured by any process and be finally sintered in accord with this exemplary embodiment of the present invention.

In one embodiment of this invention, the alumina cermet is an $Al_2O_3$ ceramic material containing a portion of a metal as a separate phase. One example of a cermet, for instance, could be an $Al_2O_3$ ceramic containing molybdenum, tungsten or other refractory metal with a melting point greater than 2000° C. Preferably, the cermet will be an aluminum-molybdenum cermet. More preferably, the cermet will include between 1–30 volume percent molybdenum. Furthermore, the cermet is preferably doped with magnesia. Magnesia helps reduce any potential sticking between lamp parts and tube and helps prevent MgO loss in the sintered lamp parts. $Al_2O_3$ and binder mixtures of the type (preferably including magnesia) described above in the context of arc chamber manufacture could be extruded in the form of the sintering tube. The extruded alumina tube could then be doped with molybdenum by soaking the tube in a solution of molybdic acid and firing the tube. Preferably, the process will yield a tube having between 1 and 30 volume percent molybdenum.

Alternatively, alumina refractory granules can be wet milled in deionized water together with up to 0.5 weight percent of magnesia to promote densification and inhibit grain growth. The desired refractory metal can then be added to the powder slurry to achieve the desired dopant level. The slurry is subsequently dried, sieved through a micron mesh and finally rolled to aglomerate most of the fine particles below 50 microns in diameter. The alumina/metal powder is then combined with a binder such as methyl cellulose or polyacrylamide, extruded into the form of a tube and sintered.

Although the invention has been described with reference to exemplary embodiments, various changes and modifications can be made without departing from the scope and spirit of the invention. Accordingly, all such modifications are intended to fall within the scope of the invention as defined by the following claims.

What is claimed is:

1. A method of making a ceramic discharge chamber comprising forming a plurality of preform chambers by assembling at least two ceramic components, axially aligning said plurality of preform chambers within a tube, said tube being comprised of an alumina cermet, and sintering said tube containing the preform chamber at a temperature of at least 900° C.

2. The method of claim 1 wherein said alumina cermet includes a molybdenum dopant.

3. The method of claim 2 wherein said alumina cermet includes between 1 and 30 percent by volume molybdenum.

4. The method of claim 1 wherein said ceramic components are comprised of alumina.

5. The method of claim 1 wherein said alumina cermet is doped with magnesia.

6. The method of claim 5 wherein said magnesia is present between 0.03 and 0.5% by weight of alumina.

7. The method of claim 1 wherein said alumina cermet is doped with yttrium or lanthanum.

8. An arc discharge lamp including a ceramic discharge chamber manufactured in accord with the method comprises of claim 1.

9. A method of manufacture of an alumina cermet tube comprising ceramic arc discharge chambers for sintering of said ceramic arc discharge chambers comprising forming a mixture of $Al_2O_3$ powder and at least one refractory metal comprising a melting temperature above about 2000° C. with a binder material, extruding said mixture to form a tube, and firing said tube to yield an alumina cermet tube comprising between 1 and 30 volume percent refractory metal.

10. The method of claim 9 wherein said refractory metal is tungsten or molybdenum.

11. The method of claim 9 wherein magnesia is further added to said mixture.

\* \* \* \* \*

UNITED STATES PATENT AND TRADEMARK OFFICE
CERTIFICATE OF CORRECTION

PATENT NO. : 6,592,808 B1
DATED : July 15, 2003
INVENTOR(S) : Frederick W. Dynys et al.

It is certified that error appears in the above-identified patent and that said Letters Patent is hereby corrected as shown below:

<u>Column 6,</u>
Line 29, should read -- An arc discharge lamp including a ceramic discharge chamber manufactured in accord with the method of claim 1. --

Signed and Sealed this

Twenty-fifth Day of November, 2003

JAMES E. ROGAN
*Director of the United States Patent and Trademark Office*